US012580217B2

(12) United States Patent
Kim et al.

(10) Patent No.: US 12,580,217 B2
(45) Date of Patent: Mar. 17, 2026

(54) ELECTRODE MANUFACTURING APPARATUS

(71) Applicant: LG Energy Solution, Ltd., Seoul (KR)

(72) Inventors: Jin Gon Kim, Daejeon (KR); Hyung Mook Jung, Daejeon (KR); Woo Jung Choi, Daejeon (KR); Su Taek Jung, Daejeon (KR); Byunguk Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 697 days.

(21) Appl. No.: 17/916,320

(22) PCT Filed: Nov. 15, 2021

(86) PCT No.: PCT/KR2021/016674
§ 371 (c)(1),
(2) Date: Sep. 30, 2022

(87) PCT Pub. No.: WO2022/145716
PCT Pub. Date: Jul. 7, 2022

(65) Prior Publication Data
US 2023/0163341 A1 May 25, 2023

(30) Foreign Application Priority Data
Dec. 28, 2020 (KR) ........................ 10-2020-0184478

(51) Int. Cl.
*H01M 10/04* (2006.01)
(52) U.S. Cl.
CPC .............................. *H01M 10/0404* (2013.01)

(58) Field of Classification Search
CPC .......... H01M 10/0404; H01M 4/0435; H01M 4/139; H01M 4/04
See application file for complete search history.

(56) References Cited

U.S. PATENT DOCUMENTS

2010/0330267 A1   12/2010   Shimizu et al.
2014/0304982 A1*  10/2014   Morishima ......... H01M 10/058
                                                                  29/623.5
(Continued)

FOREIGN PATENT DOCUMENTS

CN        111129609 A        5/2020
JP        2008173590 A       7/2008
(Continued)

OTHER PUBLICATIONS

Search Report dated Aug. 9, 2024 from the Office Action for Chinese Application No. 202180020603.6 Issued Aug. 23, 2024, pp. 1-2. [See p. 1, categorizing the cited references].
(Continued)

*Primary Examiner* — Thomas J Hong
*Assistant Examiner* — Jose K Abraham
(74) *Attorney, Agent, or Firm* — Lerner David LLP

(57) ABSTRACT

An electrode manufacturing apparatus according to one embodiment is an electrode manufacturing apparatus that traverses an electrode substrate having a coated portion and an uncoated portion. The apparatus includes: a traversing roller that traverses the electrode substrate, wherein the traversing roller includes a first roller, and a second roller surrounding an outer surface of the first roller, and wherein a diameter of a central part of the second roller is larger than a diameter of one end part of the second roller.

10 Claims, 6 Drawing Sheets

(56)         References Cited

U.S. PATENT DOCUMENTS

| | | |
|---|---|---|
| 2015/0336760 A1 | 11/2015 | Lee |
| 2020/0206965 A1 | 7/2020 | Kwak et al. |
| 2021/0043980 A1 | 2/2021 | Wang et al. |

FOREIGN PATENT DOCUMENTS

| | | | | |
|---|---|---|---|---|
| JP | 2009280355 A | | 12/2009 | |
| JP | 4985543 B2 | * | 7/2012 | |
| JP | 2014061528 A | * | 4/2014 | ........... B21B 13/142 |
| JP | 2014120273 A | * | 6/2014 | |
| JP | 2014123491 A | | 7/2014 | |
| JP | 2016006765 A | | 1/2016 | |
| JP | 2016181345 A | | 10/2016 | |
| JP | 2017191678 A | | 10/2017 | |
| JP | 2020087855 A | | 6/2020 | |
| KR | 20100120239 A | | 11/2010 | |
| KR | 20150040480 A | | 4/2015 | |
| KR | 101537517 B1 | * | 7/2015 | ............. B21B 27/02 |
| KR | 20170048757 A | * | 5/2017 | ........ H01M 10/0404 |
| KR | 20180081310 A | | 7/2018 | |
| KR | 20200104598 A | | 9/2020 | |

OTHER PUBLICATIONS

Extended European Search Report including Written Opinion for Application No. 21915514.0 dated May 17, 2024, pp. 1-8.
International Search Report for PCT/KR2021/016674 mailed Mar. 2, 2022. 4 pgs.

* cited by examiner

【FIG. 1】
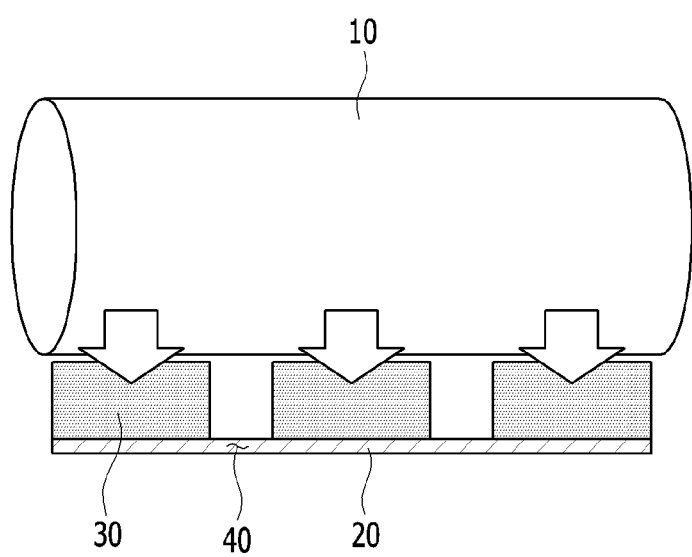
【FIG. 2】
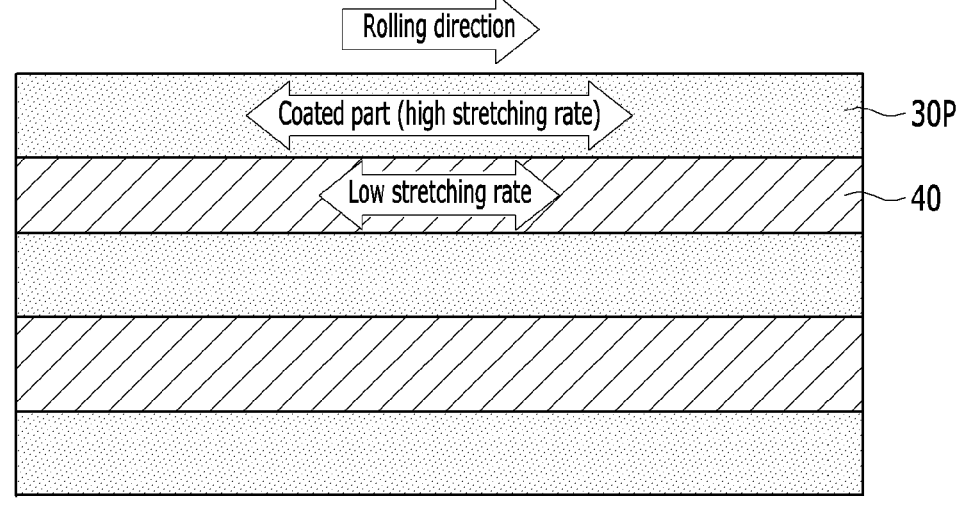

【FIG. 3】
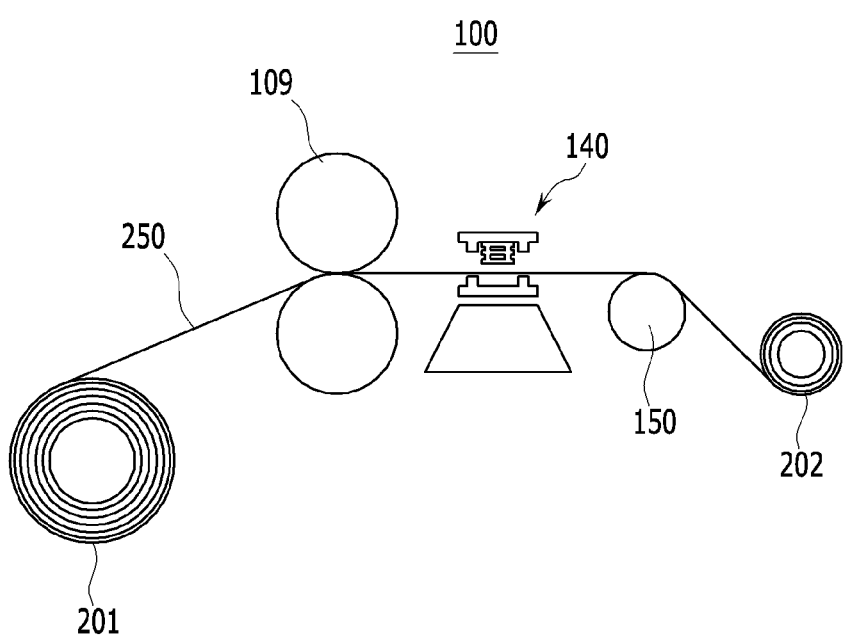

【FIG. 4】
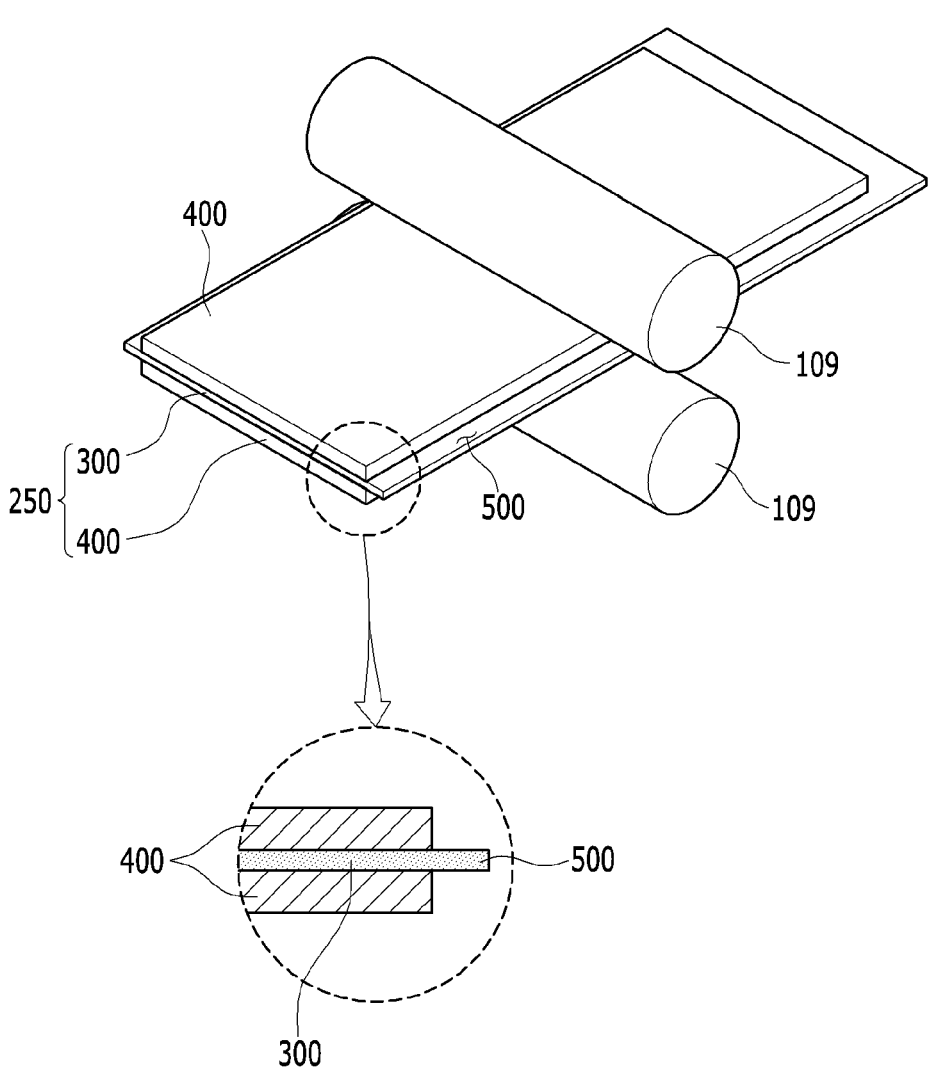
【FIG. 5】
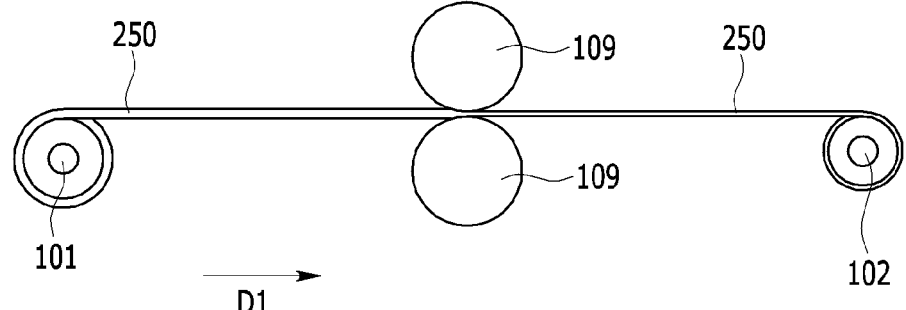

【FIG. 6】
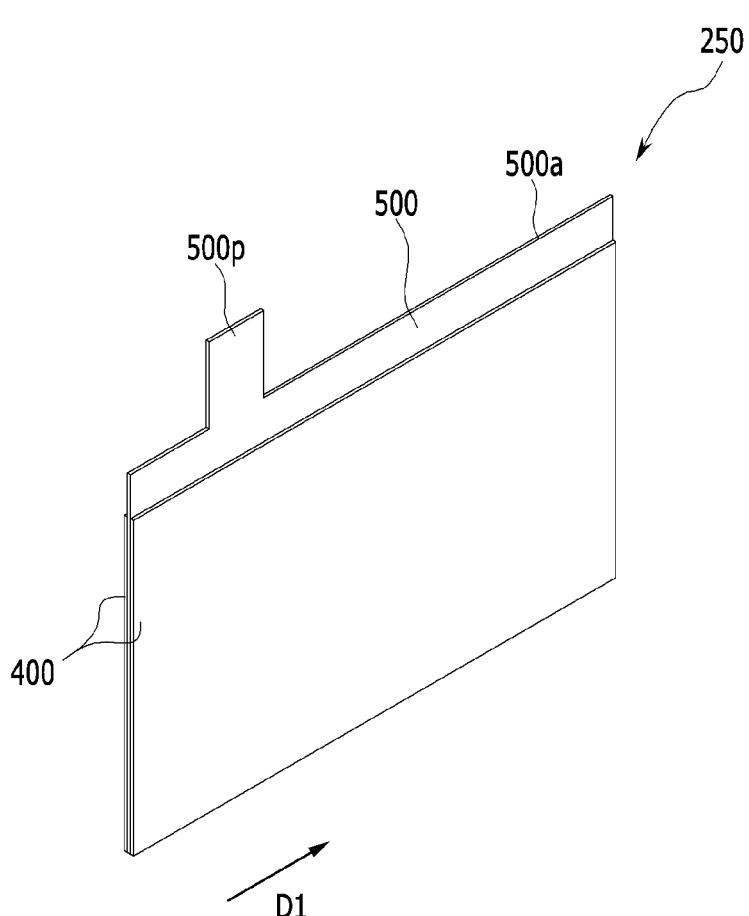

【FIG. 7】
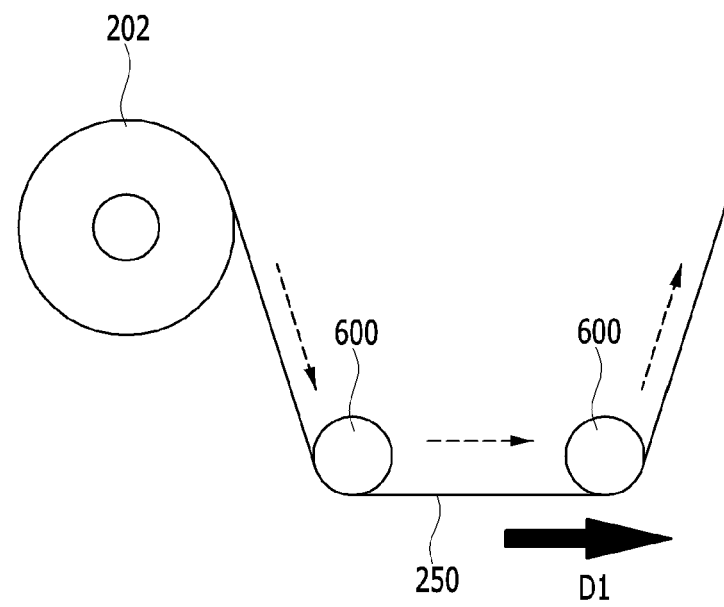
【FIG. 8】
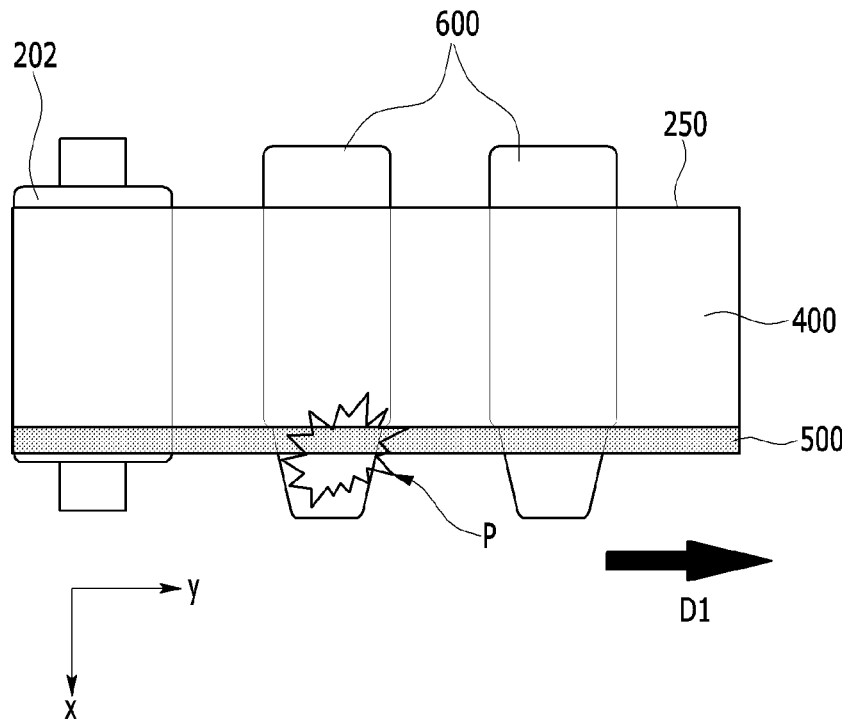

【FIG. 9】
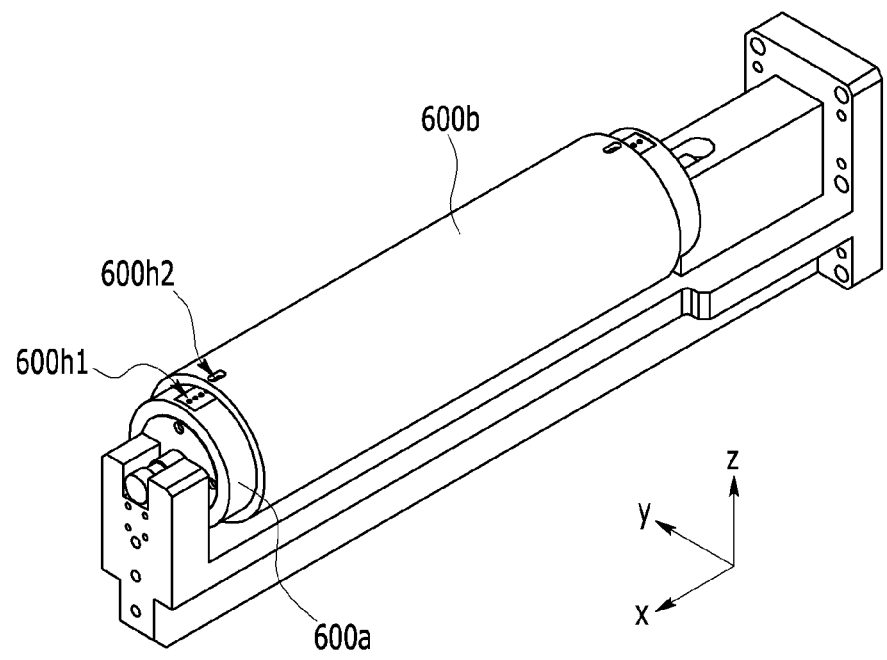
【FIG. 10】
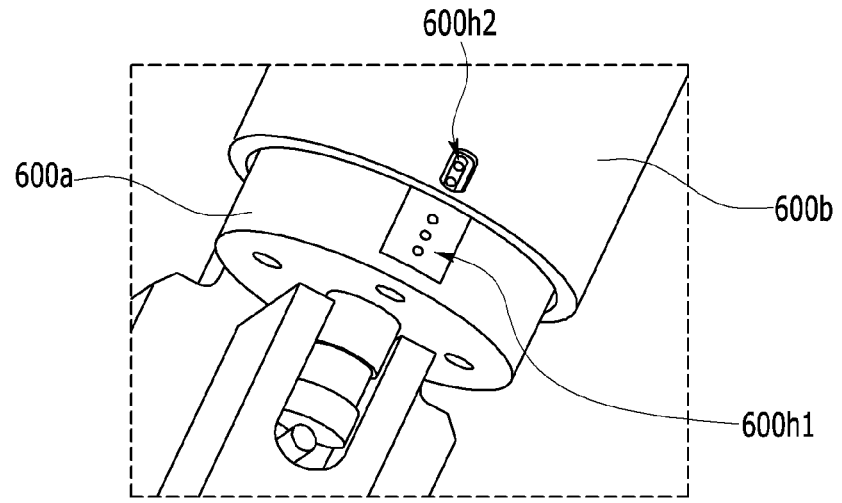

ELECTRODE MANUFACTURING APPARATUS

CROSS-REFERENCE TO RELATED APPLICATIONS

The present application is a national phase entry under 35 U.S.C. § 371 of the International Application No. PCT/KR2021/016674 filed on Nov. 15, 2021, which claims priority from Korean Patent Application No. 10-2020-0184478 filed on Dec. 28, 2020, the disclosures of which are incorporated herein by reference in their entireties.

FIELD OF THE INVENTION

The present disclosure relates to an electrode manufacturing apparatus, and more particularly, to an electrode manufacturing apparatus that prevents breakage of an electrode.

BACKGROUND OF THE INVENTION

Along with the technology development and increased demand for mobile devices, demand for secondary batteries has also been rapidly increased. Among the secondary batteries, lithium secondary batteries having high energy density and operating voltage and excellent preservation and lifetime characteristics have been widely used as energy sources of various electronic products as well as various mobile devices.

The secondary battery can be formed by inserting an electrode assembly composed of a positive electrode plate, a negative electrode plate, and a separator into a case, and then sealing the case. A positive electrode plate or a negative electrode plate (hereinafter, referred to as "electrode substrate") can be configured by coating an active material slurry onto a positive conductive current collector or a negative conductive current collector to a predetermined thickness, interposing a separator between the positive electrode conductive current collector and the negative electrode conductive current collector, and winding the plate in a jelly-roll type many times or laminating it in a plurality of layers to form an electrode assembly.

The electrode substrate may be formed of an active material coating portion coated with an active material slurry and an uncoated portion not coated with an active material slurry. The active material coating portion can include a rolling process for increasing the adhesiveness to the electrode current collector and increasing the volume density of the active material. The rolled electrode plate can, after drying, be used by being passed through a cutter having a certain width and cut into a predetermined size.

The rolling process has a problem that a compression deviation occurs due to a difference in thickness between the coating portion and the uncoated portion at the time of rolling the electrode plate. Due to such a deviation, unbalanced plastic deformation of the electrode current collector may occur, thereby causing a residual stress. In particular, the tensile residual stress may cause a reduction of fatigue durability and a reduction of fracture strength of components.

FIG. 1 is a schematic diagram showing a rolling process using a conventional rolling apparatus. FIG. 2 is a plan view showing an electrode plate after rolling.

Referring to FIG. 1, a roll process of rolling a coated portion 30 and an uncoated portion 40 formed on an electrode current collector 20 by a rolling roll 10 may be performed. At this time, the pressure is concentrated on the coated portion 30, and as shown in FIG. 2, a difference occurs between the degree of stretching of the coated portion 30P and the degree of stretching of the noncoated portion 40, and wrinkles may be generated in the uncoated portion 40. Due to the wrinkles of the uncoated portion 40 generated during rolling, process defects such as breakage of an electrode may occur in a subsequent process. In particular, while a high tensile residual stress remains at a boundary surface between the coated portion 30P and the uncoated portion 40, they can continuously receive weak stress due to the contraction and expansion of the electrode, and may become vulnerable to fracture.

It is an object of the present disclosure to provide an electrode manufacturing apparatus that prevents breakage of an electrode.

However, the technical problem to be solved by embodiments of the present disclosure is not limited to the above-described problems, and can be variously expanded within the scope of the technical idea included in the present disclosure.

According to one embodiment of the present disclosure, there is provided an electrode manufacturing apparatus that traverses an electrode substrate having a coated portion and an uncoated portion, the apparatus comprising: a traversing roller that traverses the electrode substrate, wherein the traversing roller comprises a first roller, and a second roller surrounding an outer surface of the first roller, and wherein a diameter of a central part of the second roller is larger than a diameter of one end part of the second roller.

The second roller may change its position in the axial direction.

The first roller and the second roller may be types of being separated in the axial direction.

The first roller has a longer axial length than the second roller, and the first roller may be exposed from the axial direction end part of the second roller.

A first groove portion having at least one groove is formed on the outer surface of the first roller exposed from the axial direction end part of the second roller, and at least one second groove portion may be formed in an axial direction end part of the second roller.

The first roller and the second roller are connected by a fastening member when the first groove portion and the second groove portion coincide with each other while the second roller change its position in the axial direction.

The fastening member may be a bolt coupling type.

The electrode substrate may include a coated portion and an uncoated portion in which a rolling process is performed.

The first roller is exposed from the axial direction end part of the second roller, and the end part of the second roller and the exposed first roller may form a step.

The electrode substrate may travel in a state where the exposed first roller corresponds to the notched tab formed on the electrode substrate.

The notched tab may be formed by notching a part of the uncoated portion.

One end part of the second roller may form a non-contact region with the electrode substrate.

According to embodiments of the present disclosure, the traversing roller is composed of a first roller and a second roller that are separable from each other, and the second roller, which is an external roller, can change its position, thereby controlling the electrode meandering.

Also, the first roller and the second roller can be connected by a fastening member, thereby minimizing loss due to replacement of parts.

Further, it is possible to prevent the notched tab folding phenomenon by using the traversing roller in which a step is formed.

In addition, a region that is not in contact with the electrode substrate can be formed by processing the end part of the second roller, which is an external roller, thereby preventing an electrode breakage phenomenon.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a schematic diagram showing a rolling process using a conventional rolling apparatus;

FIG. 2 is a plan view showing an electrode plate after rolling;

FIG. 3 is a view schematically showing a guide roll device;

FIG. 4 is a perspective view showing the electrode rolling device of FIG. 3;

FIG. 5 is a view schematically showing a state in which the electrode rolling device of FIG. 4 is viewed from the side surface;

FIG. 6 is a perspective view showing an electrode substrate formed by the notching process section of FIG. 3;

FIG. 7 is a view showing an electrode manufacturing apparatus according to an embodiment of the present disclosure;

FIG. 8 is a plan view of the electrode manufacturing apparatus of FIG. 7 as viewed from above;

FIG. 9 is a perspective view showing a traversing roller according to an embodiment of the present disclosure; and FIG. 10 is an enlarged view of one end part of the traversing roller of FIG. 9.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is a view schematically showing a guide roll device.

Referring to FIG. 3, the guide roll device 100 includes a feeding roll 201, a rolling roll 109, a notching process section 140, a guide roll 150, and a winding roll 202. Specifically, the guide roll device 100 comprises a feeding roll 201 that winds the electrode substrate 250, a rolling roll 109 in which the electrode substrate 250 is unwound from the feeding roll 201 and supplied to the guide roll device 100, and the supplied electrode substrate 250 is rolled, a notching process section 140 that performs a notching process to form a notched tab, a guide roll 150 that traverses the electrode substrate 250, and a winding roll 202 that rewinds the electrode substrate 250 in which the rolling process and the notching process have been completed.

Before rolling the electrode substrate 250 by the rolling roll 109, the guide roll device 100 can unwind the electrode substrate 250 wound on the feeding roll 201 and coat an electrode mixture containing an active material onto an electrode current collector.

FIG. 4 is a perspective view showing the electrode rolling device of FIG. 3. FIG. 5 is a view schematically showing a state in which the electrode rolling device of FIG. 4 is viewed from the side surface.

Referring to FIGS. 4 and 5, the electrode substrate 250 can be rolled in a state in which the active material is coated onto the electrode current collector layer 300 to form the coated portion 400 and the uncoated portion 500, as described above.

The electrode rolling device 100 includes an unwinding roller 101 that unwinds the electrode substrate 250 having a coated portion 400 having a coating material formed on the electrode current collector layer 300 and an uncoated portion 500 corresponding to a plain portion, a rewinding roller 102 that rewinds the electrode substrate 250, a rolling roll 109 this is positioned between the unwinding roller 101 and the rewinding roller 102 and rolls the coated portion 400 and the uncoated portion 500 of the electrode substrate 250 according to the moving direction of the electrode substrate 250. The uncoated portion 500 may refer to a region excluding the coated portion 400 formed on the electrode current collector layer 300.

The unwinding roller 101 provides the electrode substrate 250, which is an object to be rolled, to the rolling device 100, and allows the electrode substrate 250 to move in the arrow direction D1 of FIG. 5 in accordance with the clockwise rotation. The electrode substrate 250 unwound by the unwinding roller 101 passes between the rolling rolls 109 while moving along the direction of the arrow. The rolling rolls 109 are respectively positioned on both sides with respect to the electrode substrate 250, and the electrode substrate 250 that has passed between the two rolling rolls 109 is pressed. After that, the electrode substrate 250 that has passed between the two rolling rolls 109 is wound on the rewinding roller 102 again.

In FIGS. 4 and 5, the electrode substrate 250 passing through the rolling roll 109 has been described as being disposed between the unwinding roller 101 and the rewinding roller 102. However, in order to ensure that the electrode manufacturing process proceeds continuously by the roll-to-roll method as shown in FIG. 3, the electrode substrate 250 supplied from the feeding roll 201 can travel without the unwinding roller 101 and the rewinding roller 102, and pass through the rolling roll 109 and be wound on the winding roll 202.

When the coated portion 400 and the uncoated portion 500 are rolled by the rolling roll 109, biased tension occurs due to the difference in tension between the coated portion 400 and the uncoated portion 500, particularly, residual stress may remain in the uncoated portion 500 or the boundary portion between the coated portion 400 and the uncoated portion 500.

FIG. 6 is a perspective view showing an electrode substrate formed by the notching process section of FIG. 3.

Referring to FIGS. 3 and 6, the uncoated portion 500 of the electrode substrate 250 may be cut by the notching process section 140 to form a notched tab 500*p*. The notched tab 500*p* may have a structure protruding from the edge portion 500*a* of the uncoated portion 500. After the notched tab 500*p* is formed by the notching process section 140, the electrode substrate 250 may be moved by the guide roll 150 for a subsequent process progress as described in FIG. 3.

FIG. 7 is a view showing an electrode manufacturing apparatus according to an embodiment of the present disclosure. FIG. 8 is a plan view of the electrode manufacturing apparatus of FIG. 7 as viewed from above.

Referring to FIGS. 7 and 8, the electrode substrate 250 on which the rolling process and the notching process have been performed may be transferred by the traversing roller 600 for a subsequent process. At this time, the residual stress accumulated due to a biased tension generated in the rolling process, etc. may remain in the uncoated portion 500, and thus breakage of the electrode base material 250 may occur. According to the present embodiment, in order to prevent the electrode substrate 250 from breaking, the diameter of the central part of the traversing roller 600 may be designed to be larger than the diameter of one end part of the traversing roller 600. According to the present embodiment, the non-contact region P for preventing the traversing roller 600 and the electrode substrate 250 from contacting each other in the uncoated portion 500 may be formed. For this purpose, the axial direction end part of the traversing roller 600 may have a tapered shape.

Next, the traversing roller 600 according to the present embodiment will be described in detail with reference to FIGS. 9 and 10.

FIG. 9 is a perspective view showing a traversing roller according to an embodiment of the present disclosure. FIG. 10 is an enlarged view of one end part of the traversing roller of FIG. 9.

Referring to FIGS. 9 and 10, the traversing roller 600 included in the electrode manufacturing apparatus according to the present embodiment includes a first roller 600*a* and a second roller 600*b* surrounding the outer surface of the first roller 600*a*. At this time, the axial length of the second roller 600*b* may correspond to the width of the electrode substrate 250 in a direction perpendicular to the traveling direction D1 of the electrode substrate 250 in FIG. 8. According to the present embodiment, the second roller 600*b* may change its position in the axial direction. The axial direction of the second roller 600*b* may be the x-axis direction of FIG. 9, and may be perpendicular to the traveling direction D1 of the electrode substrate 250. By allowing the second roller 600*b* to change its position in the axial direction, it is possible to control meandering of the electrode substrate 250. Further, the first roller 600*a* and the second roller 600*b* may be types that are separated in the axial direction.

The first roller 600*a* according to the present embodiment has a longer axial length than the second roller 600*b*, and the first roller 600*a* may be exposed from the axial direction end part of the second roller 600*b*. In other words, the first roller 600*a* is an inner roller, and the second roller 600*b* is an outer roller and surrounds the circumference of the first roller 600*a*, and a part of the first roller 600*a* having a longer axial length than the second roller 600*b* protrudes outside the second roller 600*b*.

The first roller 600*a* and the second roller 600*b* may be fastening members. The fastening member may have a bolt fastening structure as an example. In order to be fastened by bolts, a first groove portion 600*h*1 having at least one groove is formed on the outer surface of the first roller 600*a* exposed from the axial direction end part of the second roller 600*b*, and a second groove portion 600*h*2 may be formed at an axial direction end part of the second roller 600*b*. At this time, when the first groove portion 600*h*1 and the second groove portion 600*h*2 coincide with the second roller 600*b* while changing its position in the axial direction, the first roller 600*a* and the second roller 600*b* can be connected by a bolt-type coupling system.

According to the present embodiment, the first roller 600*a* is exposed from the axial direction end part of the second roller 600*b*, and the end part of the second roller 600*b* and the exposed first roller 600*a* may form a step. Since the electrode substrate 250 travels in a state where the exposed first roller 600*a* corresponds to the notched tab 500*p* shown in FIG. 6, it is possible to prevent the notched tab 500*p* from being folded.

Further, the diameter of the central part of the second roller 600*b* may be larger than the diameter of one end part of the second roller 600*b*. In this regard, as described in FIG. 8, the diameter of the central part of the traversing roller 600 may be designed to be larger than the diameter of one end part of the traversing roller 600, and the diameter of the central part of the second roller 600*b* included in the traversing roller 600 is designed to be larger than the diameter of one end part of the second roller 600*b*, whereby a non-contact region not in contact with the electrode substrate 250 may be formed at one end part of the second roller 600*b*.

Although preferred embodiments of the present disclosure have been shown and described above, the scope of the present disclosure is not limited thereto, and numerous other variations and modifications made by those skilled in the art using the basic principles of the invention defined in the appended claims also fall within the spirit and scope of the invention.

DESCRIPTION OF REFERENCE NUMERALS

109: rolling roll
250: electrode substrate
500*p*: notched tab
600: traversing roller
600*a*: first roller
600*b*: second roller
600*h*1: first groove portion
600*h*2: second groove portion

The invention claimed is:

1. An electrode manufacturing apparatus that traverses an electrode substrate having a coated portion and an uncoated portion, the apparatus comprising:

a traversing roller that traverses the electrode substrate,

7

8 wherein the traversing roller comprises a first roller having an outer surface, and a second roller surrounding the outer surface of the first roller, wherein the first roller is an inner roller, and the second roller is an outer roller surrounding the circumference of the first roller, wherein a diameter of a central part of the second roller is larger than a diameter of one end part of the second roller, and wherein the second roller is configured to change a position thereof in an axial direction.

2. The electrode manufacturing apparatus according to claim 1, wherein:

the first roller and the second roller are separable in the axial direction.

3. The electrode manufacturing apparatus according to claim 1, wherein:

the first roller has a longer axial length than an axial length of the second roller, and the first roller is exposed by at least one end part of the second roller in the axial direction.

4. The electrode manufacturing apparatus according to claim 3, wherein:

a first groove portion having at least one groove is formed on the outer surface of the first roller exposed by the at least one end part of the second roller in the axial direction, and at least one second groove portion is formed in the at least one end part of the second roller.

5. The electrode manufacturing apparatus according to claim 4, wherein:

the first roller and the second roller are connected by a fastening member when the first groove portion and the second groove portion coincide with each other.

6. The electrode manufacturing apparatus according to claim 5, wherein:

the fastening member is a bolt coupling type.

7. The electrode manufacturing apparatus according to claim 1, wherein:

the first roller is exposed by the at least one end part of the second roller, and the at least one end part of the second roller and the exposed first roller form a step.

8. The electrode manufacturing apparatus according to claim 7, wherein:

the electrode substrate is configured to travel in a state where the exposed first roller corresponds to a notched tab formed on the electrode substrate.

9. The electrode manufacturing apparatus according to claim 8, wherein: the notched tab is formed by notching a part of the uncoated portion.

10. The electrode manufacturing apparatus according to claim 1, wherein:

one end part of the second roller forms a non-contact region with the electrode substrate.

* * * * *